Nov. 19, 1968     G. A. DEAN     3,411,641

APPARATUS FOR HANDLING SHEETS

Filed Dec. 1, 1967     6 Sheets-Sheet 1

INVENTOR.
GEORGE A. DEAN
BY
Bierman + Bierman
ATTORNEYS

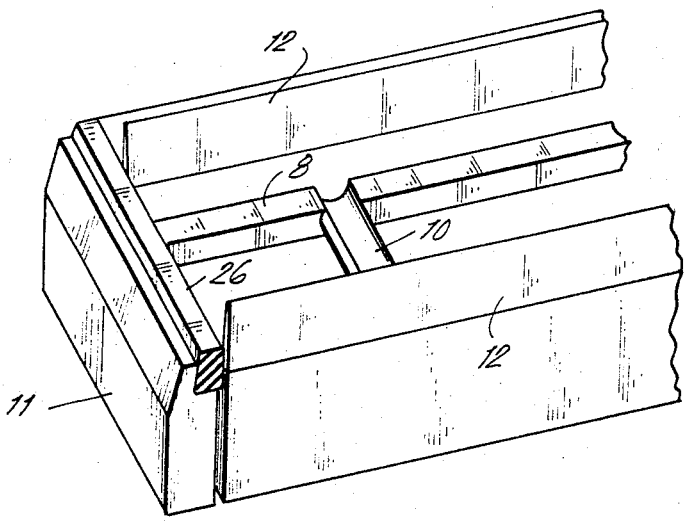
FIG. 2
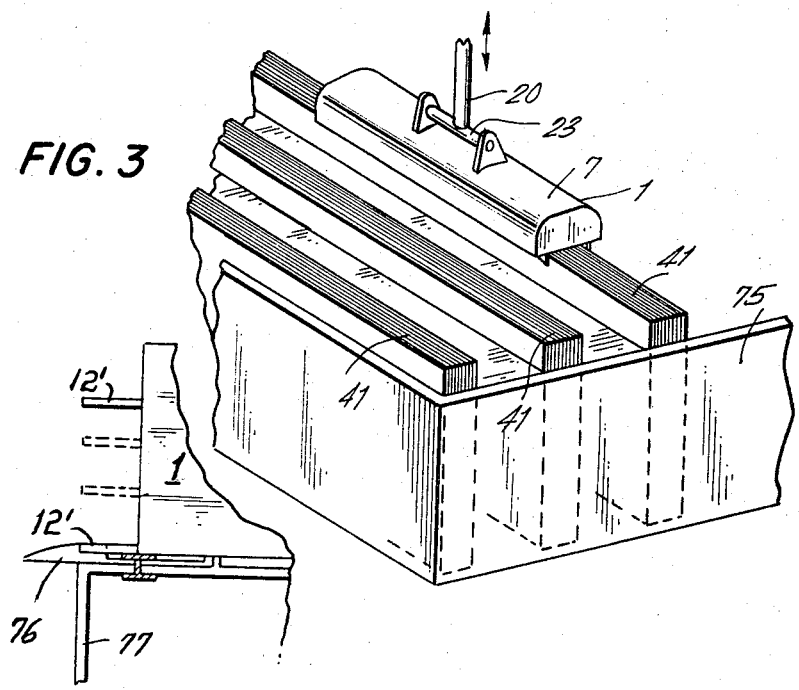
FIG. 3
FIG. 13
INVENTOR.
GEORGE A. DEAN
BY
Bierman + Bierman
ATTORNEYS Nov. 19, 1968 G. A. DEAN 3,411,641
APPARATUS FOR HANDLING SHEETS
Filed Dec. 1, 1967 6 Sheets-Sheet 3

INVENTOR.
GEORGE A. DEAN

Bierman & Bierman
ATTORNEYS

Nov. 19, 1968  G. A. DEAN  3,411,641

APPARATUS FOR HANDLING SHEETS

Filed Dec. 1, 1967  6 Sheets-Sheet 4

INVENTOR.
GEORGE A. DEAN
BY
Bierman & Bierman
ATTORNEYS

Nov. 19, 1968

G. A. DEAN 3,411,641

APPARATUS FOR HANDLING SHEETS

Filed Dec. 1, 1967

INVENTOR.
GEORGE A. DEAN
BY
Bierman & Bierman
ATTORNEYS

Nov. 19, 1968  G. A. DEAN  3,411,641

APPARATUS FOR HANDLING SHEETS

Filed Dec. 1, 1967  6 Sheets-Sheet 6

INVENTOR.
GEORGE A. DEAN

Bierman + Bierman
ATTORNEYS 3,411,641
APPARATUS FOR HANDLING SHEETS
George A. Dean, Overland Park, Kans., assignor to Dean Research Corporation, a corporation of Missouri
Continuation-in-part of application Ser. No. 565,650, July 6, 1966. This application Dec. 1, 1967, Ser. No. 690,368
22 Claims. (Cl. 214—8.5)

ABSTRACT OF THE DISCLOSURE

Method and apparatus for handling stacked sheets of material wherein a head is provided for engaging the flat sides of the sheets, a vacuum is applied thereto causing the sheets to adhere to one another, moving the sheets to a desired location, and releasing the vacuum whereby the stack of sheets is also released.

Method and apparatus for upending stacks of sheets to feed them into the head. The area of the apparatus subjected to the vacuum is substantially larger than the area in contact with the sheets whereby a mechanical advantage in clamping pressure is achieved.

---

This application is a continuation-in-part of my co-pending application, Ser. No. 565,650, filed July 6, 1966 (now abandoned), and entitled, "Apparatus for Handling Sheets."

The present invention is directed to the handling of sheet material in the form of stacks and, in certain embodiments thereof, to sheets in a substantially vertical position, such as metal, glass, plastic and other materials. It is also applicable to handling paper and the like.

Further, the invention relates to sheet handling and transferring apparatus and, more particularly, to means by which batches composed of desired numbers of the sheets are picked up from a stack and are transferred to a conveyor or other support.

It is an object of the invention to provide an apparatus of this character by means of which batches of sheets in selected number will be suctionally engaged by a gripping head and moved in a manner to cause "breaking" or separation of the sheets while they are held by the head, with the head removing the batches to a desired position on an elevator, conveyor, or other supporting surface, and then releasing the sheets so transported.

It is also among the objects of the invention to provide in an apparatus of this kind, means which will select and positively grip the required numbers of the sheets; which will engage them in such a manner as to remove any irregularity in the positioning of the sheets in respect to one another, and at the same time eliminate any wavy condition that then exists in the sheets.

With these and other objects to be hereinafter set forth in view, there is provided the arrangement of parts to be described and more particularly pointed out in the claims appended hereto.

In practicing the invention, the sheet material, on a pallet or on a skid, is brought to a somewhat vertical position on the "up-ender" section of the conveyor. The head is lowered until it embraces the upper edge of the stack of material on the skid, a pressure differential is applied, and the material then transferred to the racks as shown.

When material is required from storage, the operator flips the required number of sheets away from the stack within the rack thus allowing the head to embrace only that material which he has flipped or displaced. A differential pressure is applied, the material is lifted vertically out of the slot and transferred to shear tables or transfer bucks.

The head pumps the air from between the sheets creating a differential pressure whose total force is greater than the weight of the material to be lifted. Thereby, the stack may be moved over a substantial distance without danger of dropping of the sheets en route.

In the accompanying drawings, wherein an illustrative embodiment of the invention is shown:

FIG. 2 shows a part of the picker or suction head;

FIG. 3 shows how batches of sheets can be placed vertically in or removed from a bin or rack;

FIG. 13 is a view showing how a retaining blade can be employed as a "hold-down" device in a stack of sheets;

Figure 1:
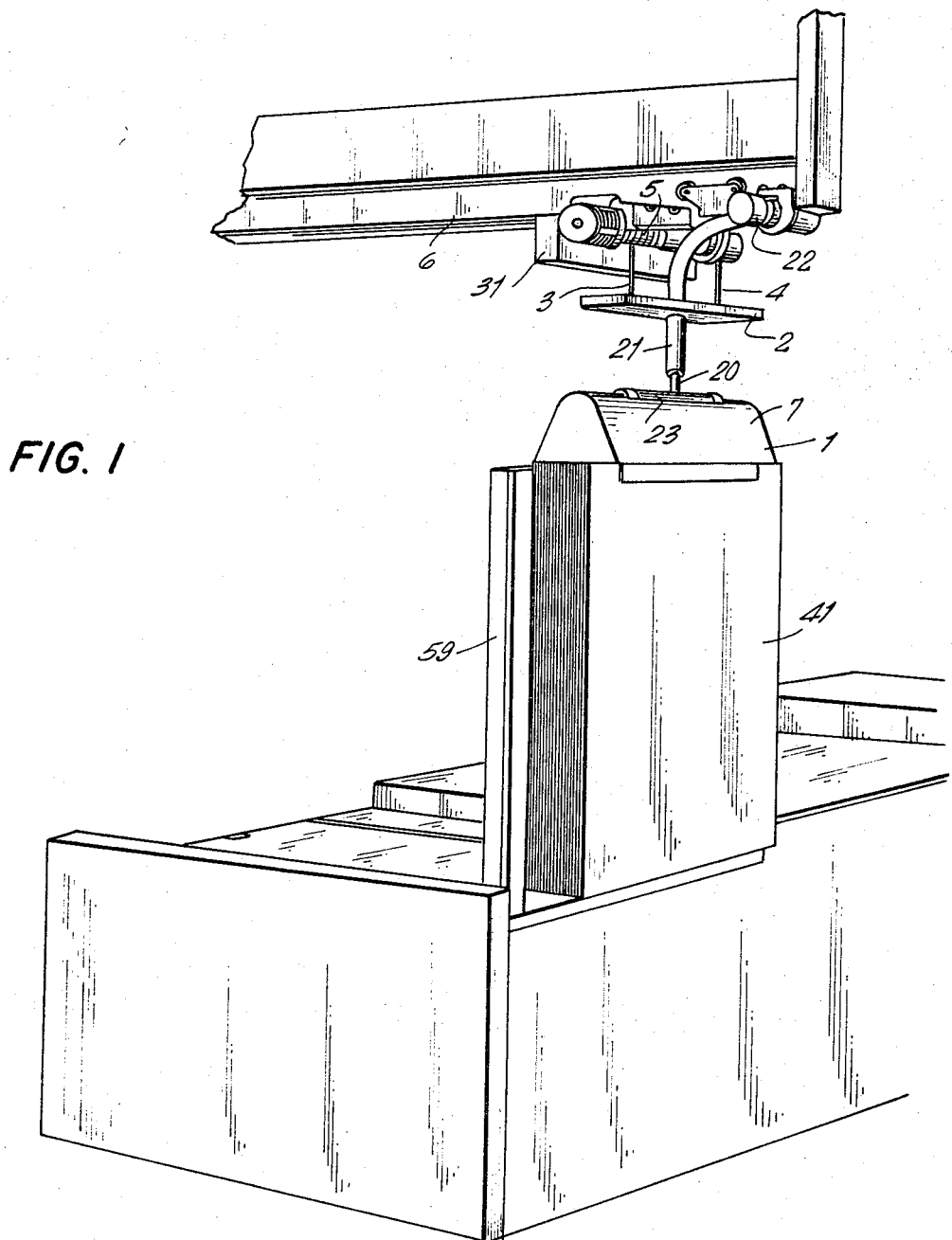
FIG. 1 is a perspective view of a sheet-handling apparatus constructed according to the invention.

Referring to the drawings and particularly to FIG. 1, it will be noted that a pick-up head is generally indicated at 1. The same includes a plate member 2, suspended on cables 3 and 4 extending from a drum or sheave 5 of a conventional hoist operative along a rail or track shown at 6. Incorporated in the plate member 2 is a bearing 55 which permits a rotative movement of the head.

In FIG. 3 it is shown how the head can be employed for raising and transporting the vertical batches 41 of sheets taken from a rack or bin 75. In this arrangement, the head engages the batches in the manner heretofore described and raises the same for transport to the point or location where required.

In many industrial applications, the sheets are stacked in a vertical position. Such sheets are commonly of metal, such as aluminum, steel and others, or are of non-metal, such as glass, plastic laminated wood, and the like. The head 1 as shown in FIG. 3 is well adapted to pick up an entire stack or part thereof, transport it to the desired location and discharge it in a vertical or horizontal position for further operations. The head, carrying a bundle of sheets from storage, is lifted by the arrangement shown in FIG. 1 to a railhead from which it is carried by a pulley system to the point of use.

The construction of the pick-up head is disclosed in FIGS. 4 to 8 inclusive and it will be therein seen that the head includes a hood or body 7 provided at its front and rear with slidably adjustable cross-bars 8 and 9 which are movable to or from one another along rods 10. Four of these rods 10 are employed, the same being mounted by screws extending into side strips 11 fixedly secured in the hood or body 7.

Figure 8:
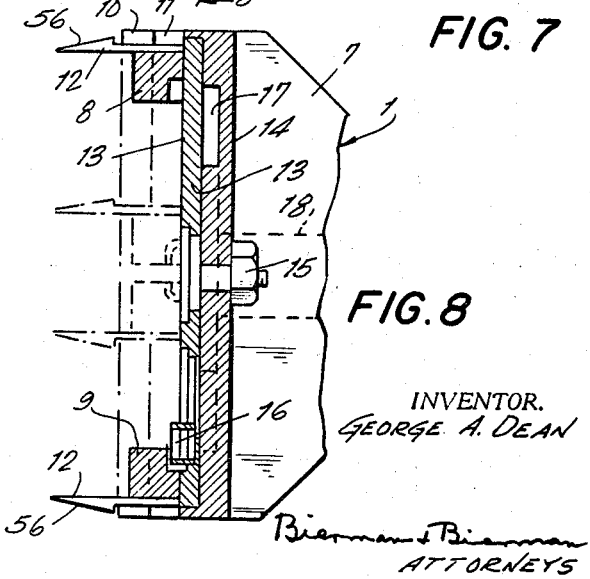
FIG. 8 is a sectional view on line 8—8 of FIG. 7.

Attached to each of the cross-bars 8 and 9 is a blade or knife 12, said blades or knives extending for nearly the length of the rectangular head, and as indicated in dotted lines in FIG. 8, the sliding movement of the cross-bars 8 and 9 toward one another will bring the blades or knives to or from one another to a required extent to enable them to be properly spaced apart to engage the desired number of sheets in a batch 41 between them as shown in FIGS. 2 and 3. The rods 10 provide a guide means for the movable blades or knives and tend to hold the knife assemblies against a plate 13 in the hood 7. Said plate 13 is circular in shape and it is recessed in one face of the fixed inner wall 14 of the head. The circular plate or disk 13 is mounted for rotative movement on a bolt 15. In said circular plate or disk 13 is mounted a short tube 16 which protrudes beyond the surface of the plate or disk 13, so that when the elements 8 and 9, carrying the blades or knives 12, are moved toward one another and toward the center of the head, the tube 16 will always be located within the cavity of the head that will embrace the batch of sheets to be engaged by the head.

The above result is accomplished by having the plate or disk 13 moves rotatively under the action of the bar 8 or 9 pushing against the tube 16. Either of the blades or knives 12 can be moved separately or they can be moved together. There will always be one or the other of the bars 8 and 9 pushing against the tube 16.

Figure 6:
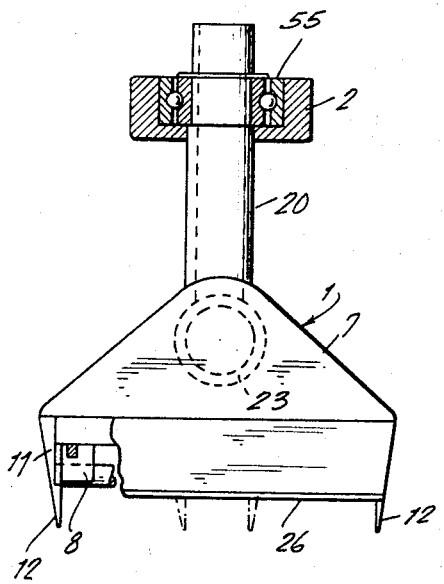
FIG. 6 is an end view of the pick-up head with some of its parts shown in section and others broken away to disclose construction.
Figure 7:
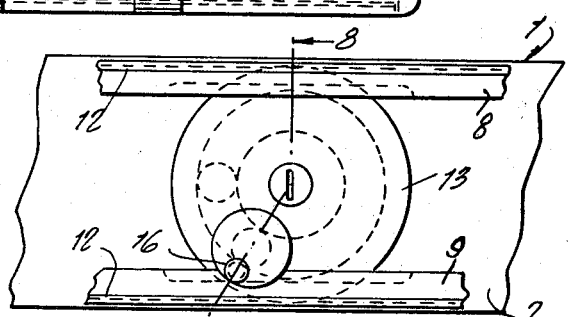
FIG. 7 is a detail view of a part of the head showing how differential pressure or suctional effect can be obtained regardless of the knife or blade position.

Provided in the plate 14 is a circular recess 17 into which a hole 18 opens and which communicates with the interior of the head. The head connects to and is pivotally attached to the lateral parts 23 of a tube 20 which is connected to a flexible tube 21 (FIG. 1) connected to a suitable suction-developing means such as a pump 22. The tube 20 is rotative in the bearing 55 as shown in FIG. 6. Whenever the plate or disk 13 revolves, the air has a passageway through tubes 20, 21 into the interior of the head and through the hole 18 to reach the cavity 17 through the offset passages 23 and out of the tube 16.

Figure 9:
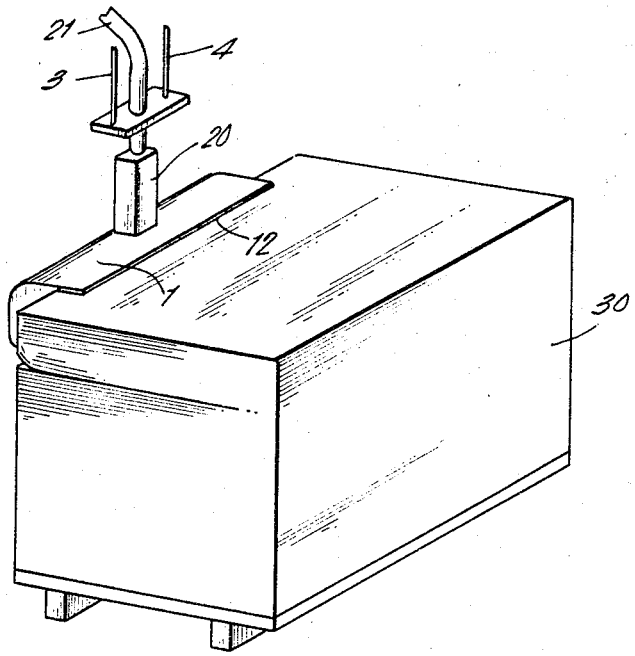
FIG. 9 is a perspective view showing the pick-up head engaging a plurality of sheets of paper in a horizontal stack preparatory to lifting the same therefrom.

In the operation of the described apparatus, the head 1 is urged against a stack 30 of paper sheets or of other sheet material substantially as shown in FIG. 9. One of the knives or blades 12 and that which is lowermost, enters into the stack 30 at the desired height from the top thereof to enable the required number of sheets to be engaged between the blades of the head. The tapered ends 56 of the blades facilitate the entry of the blades between the sheets.

Figure 4:
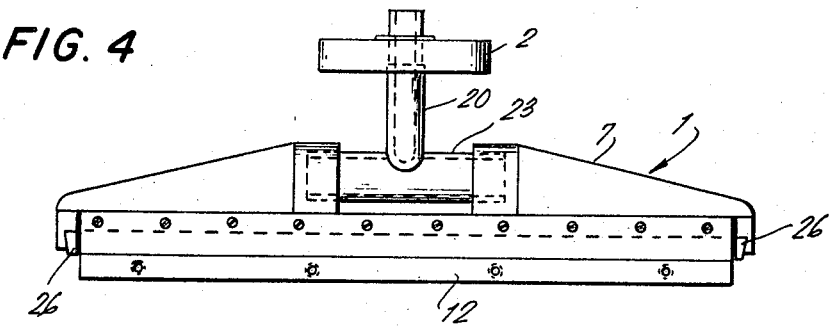
FIG. 4 is a front elevational view of the pick-up head.
Figure 5:
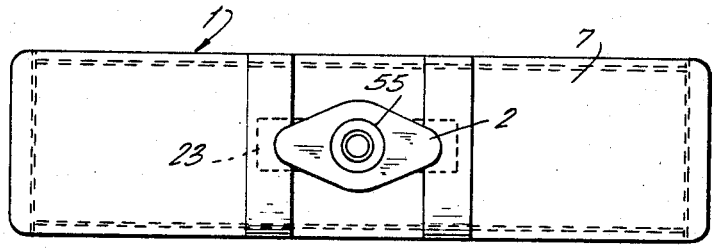
FIG. 5 is a plan view of the same.

It will be observed in FIG. 4 that the opposite ends of the head are provided with sealing strips 26 and when these strips contact with the ends of the sheets in the engaged batch, a sealing effect is attained and the knife or blade which is then uppermost is lowered to bring it into contact with the top sheet in the stack. At this time the vacuum is exerted through the tubes 20, 21, 23, producing a suctional effect across the ends of the sheets then embraced between the blades or knives 12.

The differential pressure thus produced forces the sheets that are between the blades securely against the ends of the head adjacent to the sealing strips 26 and locks the sheets securely in the head at 90° to the faces of the knife edges. As this differential pressure, or exerted suctional effect, is considerably greater than the weight of the gripped batch of paper sheets, indicated at 41, the batch of sheets can be lifted and transported at will, the initial lifting movement of a batch of the sheets being shown in FIG. 10.

Figure 12:
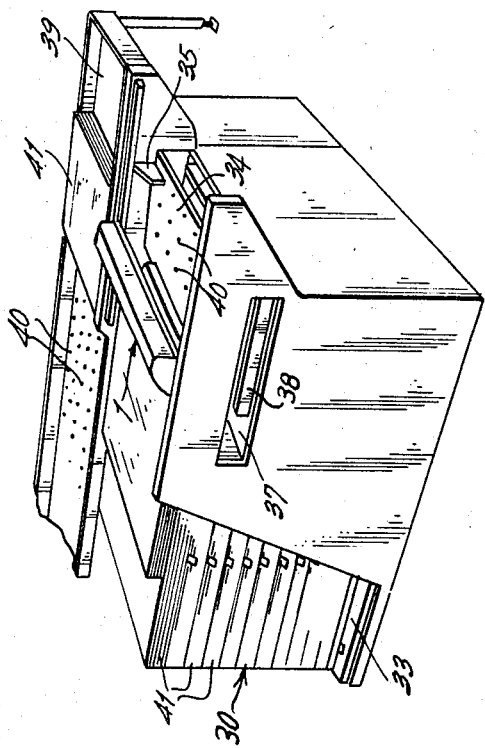
FIG. 12 shows the elevator and associated parts for effecting the transfer of the sheets.

The head 1 is suspended from the plate or cross member 2 which can be moved by hydraulic power or chain drive along one or more rails, one of which is shown at 6. The stacked paper 30 is mounted on a skid (FIG. 9) and is placed on an elevator 33 (FIG. 12). The head 1 engages the upper portion of the stack in the manner described and as shown in FIG. 9 suctionally engages the gripped upper portion or batch of sheets in the stack and withdraws such portion or batch from the top of the stack, sliding the same horizontally onto an elevating table as shown at 34 in FIG. 12. As the head passes between two stops, one of which is shown at 35 in FIG. 12, a switch releases the vacuum, causing the batch that was moved by the head to be released, leaving it resting on the table 34. The head then moves to the left, as viewed in FIG. 12, where it stops until ready to again engage a next batch of sheets from the top of the stack 30.

When the batch of sheets is released to cause it to rest on top of the table 34, the table descends downwardly until it is brought to a level with a support 37, at which time a pusher bar shown at 38 pushes the batch of sheets onto a surface 39 from or by which the sheets are transferred to a point of the next operation. The elevating table 34 as well as the transfer surface 39 may be provided with air jet openings 40, permitting the batch of sheets 41 to be freely floated with a minimum of friction.

After the pusher bar 38 has cleared the elevating table 34, the elevator shown at 33 indexes upward for a distance equal to the height of the next batch of sheets to be transferred to the surface 39, then the head 1 cycles into the stack 30 for the next operation.

Figure 10:
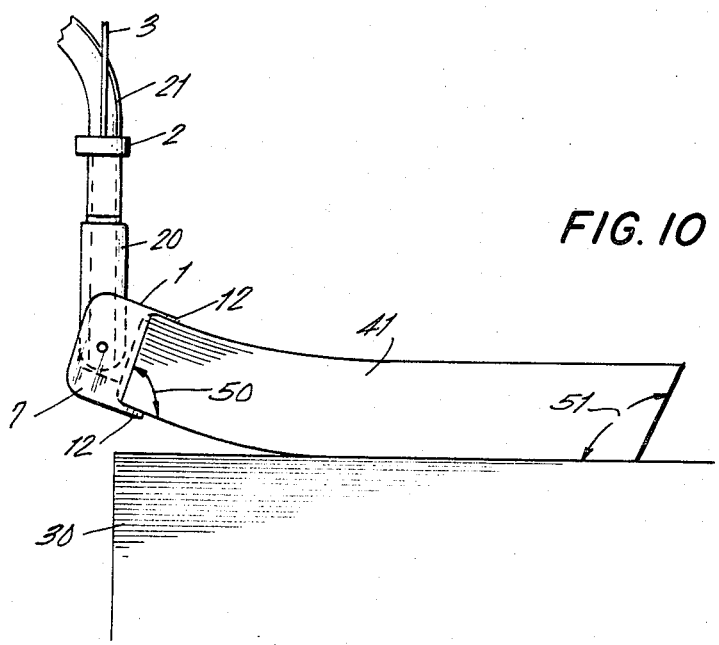
FIG. 10 shows the selected number of sheets engaged by the head and being lifted from the stack.

In FIG. 10, the left end of the batch 41 of sheets is shown as having been engaged by the head 1 and is being raised while the batch is being held securely by the suction or differential in pressure which forces the sheets against the side members of the head. The angle of the engaged edges of the sheets, which angle is indicated at 50 remains at 90° in respect to the opposite faces of the engaged sheets, while the angle shown at 51 defined by the opposite or free edges of the sheets increases beyond 90°. This action is important as it is an action produced in order to secure the separation of the sheets in the batch. This is what is termed "breaking" and is required because of the fact that printed sheets often stick together when stacked due to adherence caused by the drying of the printing ink.

With the described apparatus, the grasp of the batch of paper securely at one edge and the lifting of it to maintain a 90° angle between its faces and one end of the batch, causes the paper to distribute a "breaking" force throughout the opposite end of the batch so that the latter edge has an increased angle and provides for a desired separation of the sheets.

Figure 11:
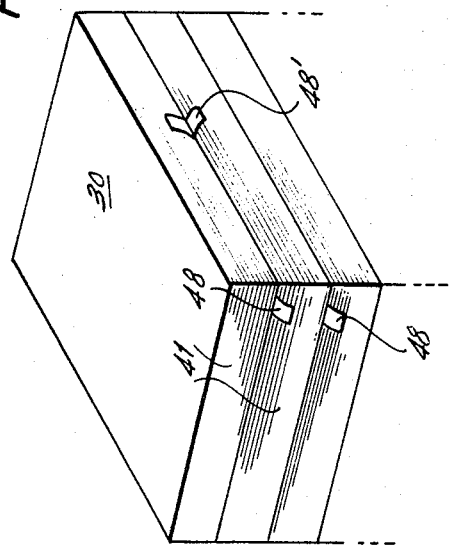
FIG. 11 shows a stack from which the batches of sheets are to be removed.

In FIG. 11 is shown the stack 30 of sheets as it looks prior to being positioned on the elevator 33. The stack may be arranged so that predetermined amounts, such as reams, of the sheets are separated by tabs 48. For example, if two of the tabs 48' are inserted at each of the points of division of the sheets, the insertion of the blades of the head can be controlled so that they will enter at the exact point. This is desirable when it is required that the exact number of sheets to be included must be accurate.

In FIG. 1 the engaged batch 41 of the sheets is shown being transferred from a stack to a conveyor using a hoist system. The head 1 therein shown, travels to the end of the rail 6 with a load or batch 41 of the sheets, and at this point a section 59 of the conveyor which may be of the air jet type, rotates vertically and embraces the head, at the same time actuating the hoist to permit the free fall of the head as the hoist tractor moves to the left as such a rate that the conveyor section returns to its position with the batch of sheets properly positioned on it. The vacuum is then discontinued and the head returns for another stack.

The rotational mounting of the head 1 permits the sheets on the conveyor to be placed upside down from the original position. This is desirable in the printing and lithographing trade and is a capability of the present apparatus.

Also, if it happens that the sheets in the stack 30 are not stacked straight and/or the faces of the sheets are undulating or wavy, when the suction is applied, the waviness will be eliminated due to the pressure exerted in forcing the sheets into the head against the end bars thereof.

In FIG. 13 is shown the use of a separating or "hold-down" blade 76 which is slidably mounted on part 77 fixed to head 1 and when the head 1 is moved toward the stack, the lower blade 12′ thereof engages the hold-down blade 76 and inserts it in the stack below the required number of sheets to form a batch and to be taken from the stack. When elements 12′ are moved to the grasping position (as shown in the dotted lines) the blade 76 will hold down the sheets in the stack that are situated below those in the batch that is being removed, thus preventing shift or dislodgment of the sheet or sheets left at the top of the stack.

Another embodiment of the invention is shown in FIGS. 14–17. The head is comprised of a front plate 81 and a back plate 71 and end plates 70. There is a front block and a rear block running the full length of the head and acting as bearings for the rod 82. Rod 82 is attached to the front plate 81 by means of plate 79. Rod 82 is steel, as is plate 79 which is welded into a groove machined in rod 82. Plate 81 is preferably of aluminum and is bolted to plate 79 throughout the entire length of the head. Shims are placed between the blocks to provide a close fit with rod 82 such that the front plate 81 is rather free to move inward and outward, with rod 82 acting as the pivot. The bolts on either end merely position the end plates 70 to the rod 82.

The rear block is rigidly fixed to the back plate 71 throughout the length of the head. The end plates 70 are also rigidly fixed to the back plate 71 along the edges and to the block on the end. There is a groove in the front plate 81 in which a rubber seal is placed to prevent leakage when the pressure is lowered within the head cavity 75. This seal also provides a rubbing surface for the ends of plate 81 against the inner face of the end plates 70.

A beam is attached to an overhead support such as a bridge, crane or other transporting mechanism. This portion of the embodiment operates substantially the same way as is shown in FIG. 1.

On the inner surfaces of plates 81 and 71 thick synthetic sponge material 73 is mounted to provide the longitudinal seal. This sponge is of such thickness that it will displace or conform to the stack of material to be transferred and make up the angularity which occurs at the pick-up point depending upon the stack width being embraced by the head. Also included are seals at either end located within the end plates 70. The end seals and the longitudinal seals 73 provide the only contact between the vertical stack and the head proper.

Figure 14:
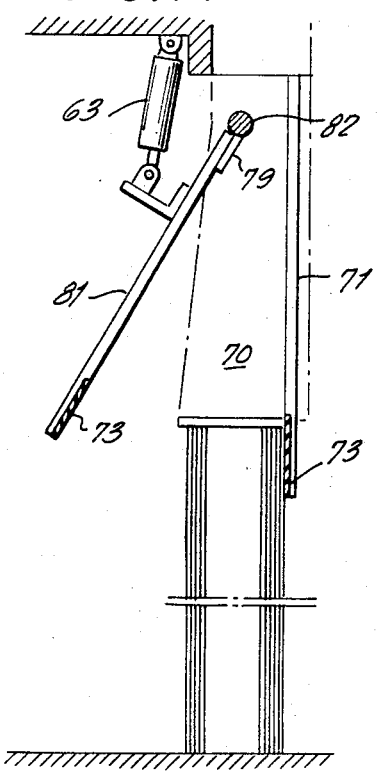
FIG. 14 is a schematic view of a modification of the invention, showing the head in the open position.

In operation, the head is lowered until the rear plate 71 is located just above and to the right of the material within the rack as shown in FIG. 14. The operator flips the required amount of material against the back plate on that portion of the lip which is longer than the front plate 81. When the desired amount of material has been placed into the head in this manner, the head is lowered until the end seals make contact.

Figure 15:
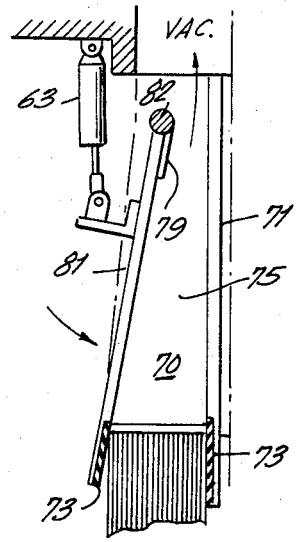
FIG. 15 is a view similar to FIG. 14 with the head closed.

Cylinder 63 is then actuated which closes the front plate 81. The pressure is then reduced in the cavity causing atmospheric pressure to force the sheet material upwards, thus locking the material into the head as shown in FIG. 15. This occurs when the pressure within the head is lower by an amount in pounds per square inch greater than the weight of a one square inch column of the material to be picked up.

Figure 16:
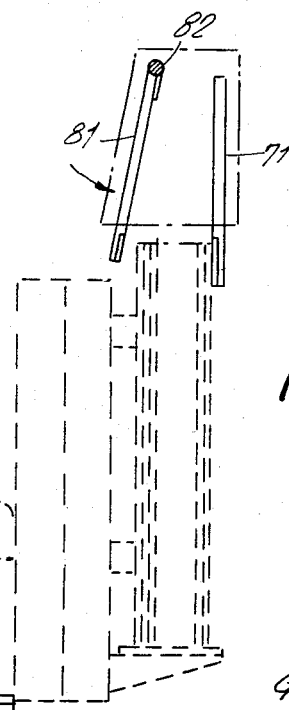
FIG. 16 is a schematic view of the device of FIG. 14 including the "upender"
Figure 16:
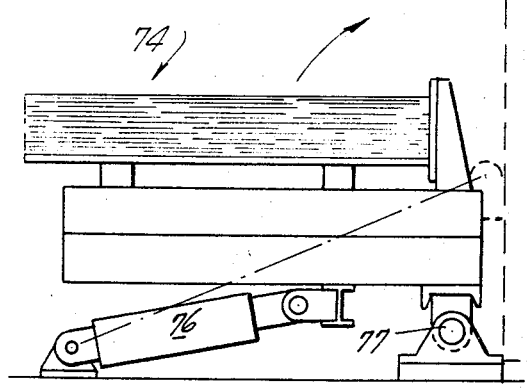

As shown in FIG. 16, a skid is placed on upender 74. The operator actuates cylinder 76 causing the upender to pivot about axis 77 to assume the position shown in broken lines. The head then picks up the stack (or any desired portion thereof) and delivers it to the new location. The new location may be another upender which will then pivot about its axis to place the stack in a horizontal position where it can be picked up by a fork lift truck.

Figure 17:
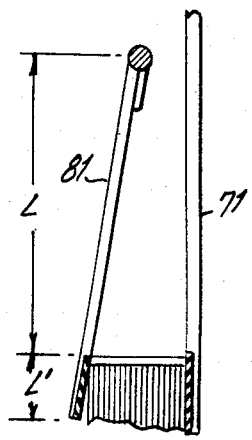
FIG. 17 is a schematic view of the embodiment of FIG. 14 showing the great clamping force attainable with lateral differential pressure.

Referring more particularly to FIG. 17, it can be seen that the actual area of front plate 81 in contact with the stack is comparatively small. The pressure on plate 81 is based on its total area and the differential pressure between cavity 75 and the external air. The effective use of the entire pressure is concentrated on the small area of actual contact with the stack. Thus, under differential pressure, a mechanical clamp will be generated over the distance L′. If there is a 10 p.s.i. vacuum in cavity 75, the linear clamping force at L′ per inch is equal to $10 \times L/2$. If L is 15 inches, the clamping per linear inch would be 75 pounds and for a 100 inch head, a total of 7,500 pounds total clamping pressure.

The combination of this clamping force and the differential pressure from top to bottom allows us to handle all materials in all sizes presently produced. This particular structure provides an absolutely uniformly distributed load over the entire length of the head, which is especially suitable for handling glass, paper, and the like.

What is claimed is:

1. Apparatus for transferring stacked sheets comprising a hollow, substantially rectangular head, open at one end, means for suspending said head, a source of vacuum communicating with the interior of said head, a member and an element each supported in said head and extending beyond said head, a seal at each end of said member and said element interposed across said head between the ends of said member and said element and the end wall of said head, said member and said element being movable toward and away from each other, a portion of each of said member and said element adapted to seal against opposite sides of said stacked sheets.

2. Apparatus according to claim 1 wherein said element and said member are mounted within said head.

3. Apparatus according to claim 1 wherein said element and said member are each provided with resilient sealing means on said portion.

4. Apparatus according to claim 1 wherein said element and said member are rotatable around an axis parallel to and displaced from said portion.

5. Apparatus according to claim 1 wherein said member is stationary and said element is rotatable about an axis substantially parallel to gripped edges of said sheets and located at the farthest edge of said element from said portion.

6. Apparatus according to claim 1 wherein the lower edge of said member extends below the lower edge of said element.

7. Apparatus according to claim 1 wherein the area of said portion is substantially smaller than the area of said element whereby an increased clamping pressure is achieved.

8. Apparatus according to claim 1 wherein there is provided an upender, said upender comprising a flat surface adapted to receive said stacked sheets, a perpendicular foot extending from said surface, said surface having a horizontal position and a vertical position, said foot being substantially horizontal when said surface is vertical, said upender so positioned as to flip said stacked sheets, said foot being substantially vertical when said surface is horizontal, means for moving said surface from said horizontal position to said vertical position and back again, said upender so positioned as to flip said stacked sheets onto the portion of said member whereby they can be gripped and lifted.

9. Apparatus according to claim 1 wherein said element and said member constitute a pair of knives in spaced parallel relationship.

10. Apparatus according to claim 9 wherein said knives are nearly the length of said head.

11. An apparatus according to claim 9 in which means are provided for moving at least one knife laterally.

12. An apparatus according to claim 9 which a recess is provided on the inside of the head opposite said open end, said recess communicating with the vacuum.

13. An apparatus according to claim 9 in which a duct from the vacuum into said head is provided to the suspending means.

14. An apparatus according to claim 9 in which means are provided for rotating the head horizontally relative to the suspending means.

15. An apparatus according to claim 9 in which means are provided for pivoting the head about a horizontal axis.

16. An apparatus according to claim 9 in which said vacuum is through a duct located at right angles to the axis of the head.

17. An apparatus in accordance with claim 9 in which means are provided for moving at least one of the knives laterally, a recess being provided on the inside of the head opposite said open end, said recess communicating with the vacuum, a duct from said vacuum into said head being provided to said suspending means, means being provided for rotating the head horizontally relative to the suspending means, means being provided for pivoting said head about a horizontal axis and said vacuum being through a duct at about right angles to the axis of the head.

18. An apparatus for transferring sheets from a stack comprising, a pick-up head mounted for disposition adjacent to the top of a stack, pivotal means for the head permitting it to be positioned against one edge of the stack, spaced parallel blades on the head, said blades being respectively entrant above and below a selected number of sheets in the stack, suction means effective in the head to effect a suctional engagement with the ends of the sheets disposed between the blades, and elevating means for the head effective to raise the gripped ends of the sheets and maintaining such ends in a certain angle in respect to the opposite faces of the sheets and causing the opposite ends of the sheets to assume a different angle thus securing a "breaking" or separating effect on the sheets.

19. An apparatus according to claim 18 wherein the blades are adjustable to or from one another, the head being provided with sealing means for contact with the ends of the sheets in the engaged batch, means for permitting the head to be rotated about an axis transverse to the width of the head, and means for establishing communication between the interior of the head in the space between the blades and a source of suction.

20. The method of handling a number of sheets taken from a stack comprising gripping the sheets to be taken at the top of the stack and applying suction to the backs or edges of the sheets so gripped to thereby maintain the backs of the sheets at right angles to the faces of the sheets, and elevating the batch of sheets thus gripped, at one end thereof so that the edges of the sheets at the opposite end of the batch assume a greater angle than is assumed by the gripped end, whereby a breaking or separating effect is obtained on the sheets in the batch.

21. In a sheet-transporting apparatus according to claim 1, said head having a pair of blades between which a batch of sheets is engaged, one of said blades being insertable below the top of a stack and at the bottom of the batch to be lifted from the stack, and a slidable hold-down member moved by said blade into the stack and operative to hold down sheets positioned below it when the head lifts the sheets above it from off the stack.

22. In a sheet-transporting apparatus according to claim 21, wherein the blade which moved the hold-down member is movable with the head and away from said member when the head elevates a pick-up batch of sheets from the stack.

References Cited

UNITED STATES PATENTS 2,776,831   1/1957   Shields.
3,289,860   12/1966  Deans _____ 294—64 XR HUGO O. SCHULZ, *Primary Examiner.*

G. F. ABRAHAM, *Assistant Examiner.*